United States Patent [19]
Bittermann et al.

[11] Patent Number: 5,867,548
[45] Date of Patent: *Feb. 2, 1999

[54] DEVICE AND METHOD FOR COLLECTING AND COOLING REACTOR-MELTDOWN PRODUCTS

[75] Inventors: Dietmar Bittermann, Fürth; Andreas Göbel, Neunkirchen A. Brand; Gerhard Hau, Albstadt; Hartmut Seidelberger, Erlangen; Horst Weisshäupl; Lothar Wistuba, both of Herzogenaurach, all of Germany

[73] Assignee: Siemens Aktiengesellschaft, Munich, Germany

[*] Notice: This patent issued on a continued prosecution application filed under 37 CFR 1.53(d), and is subject to the twenty year patent term provisions of 35 U.S.C. 154(a)(2).

[21] Appl. No.: 569,676

[22] Filed: Dec. 8, 1995

Related U.S. Application Data

[63] Continuation of PCT/DE94/00617 Jun. 1, 1994.

[30] Foreign Application Priority Data

Jun. 8, 1993 [DE] Germany .......................... 43 19 094.4

[51] Int. Cl.$^6$ .................................................. G21C 9/016
[52] U.S. Cl. ........................................... 376/280; 376/284
[58] Field of Search ..................... 376/280, 284

[56] References Cited

U.S. PATENT DOCUMENTS

| | | | |
|---|---|---|---|
| 5,057,271 | 10/1991 | Turricchia | 376/280 |
| 5,080,857 | 1/1992 | Miller et al. | 376/280 |
| 5,263,066 | 11/1993 | Szabo et al. | 376/280 |
| 5,343,505 | 8/1994 | Serviere | 376/280 |
| 5,343,506 | 8/1994 | Artnik et al. | 376/280 |
| 5,402,456 | 3/1995 | Schabert et al. | 376/280 |
| 5,415,625 | 5/1995 | Turricchia | 376/280 |

FOREIGN PATENT DOCUMENTS

| | | |
|---|---|---|
| 0 392 604 | 10/1990 | European Pat. Off. . |
| 0 419 159 | 1/1992 | European Pat. Off. . |
| 0 563 739 | 10/1993 | European Pat. Off. . |
| 27 10 290 | 9/1978 | Germany . |
| 29 25 680 | 10/1980 | Germany . |
| 4041295 | 7/1992 | Germany ............................. 376/280 |
| 2 030 347 | 4/1980 | United Kingdom . |

OTHER PUBLICATIONS

Swedish Patent Abstract No. SE A 8 004 988, (Norman), Jun. 1981.

Publ. Icenes 89 (von Möllendorf et al.), pp. 19–24, "Emerging Nuclear Energy Systems 1989", Jul. 1989.

*Primary Examiner*—Daniel D. Wasil
*Attorney, Agent, or Firm*—Herbert L. Lerner; Laurence A. Greenberg

[57] ABSTRACT

A device for collecting and cooling reactor-meltdown products from a reactor pressure vessel includes an antechamber disposed below the reactor pressure vessel and an expansion chamber for the reactor-meltdown products. A channel which is disposed between the antechamber and the expansion chamber has a partition being destructible by the reactor-meltdown products. A closure element which connects a coolant reservoir to the expansion chamber is destructible by the reactor-meltdown products. A method for collecting and cooling reactor-meltdown products from a reactor pressure vessel includes collecting reactor-meltdown products in an antechamber disposed below the reactor pressure vessel and keeping them in the antechamber for a predetermined time interval. A partition disposed between the antechamber and an expansion chamber is destroyed with the reactor-meltdown products. The reactor-meltdown products penetrate from the antechamber into the expansion chamber and are spread in the expansion chamber. A closure element is destroyed with the reactor-meltdown products in the expansion chamber, for connecting a coolant reservoir to the expansion chamber and permitting coolant to flow into the expansion chamber where it cools the reactor-meltdown products.

29 Claims, 4 Drawing Sheets

DEVICE AND METHOD FOR COLLECTING AND COOLING REACTOR-MELTDOWN PRODUCTS

CROSS-REFERENCE TO RELATED APPLICATION

This application is a continuation of International Application Serial No. PCT/DE94/00617, filed Jun. 1, 1994.

BACKGROUND OF THE INVENTION

FIELD OF THE INVENTION

The invention relates to a device and a method for collecting and cooling a reactor melt or reactor-meltdown products from a reactor pressure vessel. The device and the method are usable particularly in EPR pressurized water reactors.

In nuclear reactors, safety considerations so far have assumed that failure of the reactor pressure vessel need not be feared, because of the choice of material and the dimensions. Recently, however, in the course of more-intensive safety investigations of nuclear energy utilization, the situation in which a reactor pressure vessel "fails", however unlikely that may be, has also been studied. In particular a new reactor type, the European pressurized water reactor or EPR has been based on such considerations. In contrast to the safety philosophy used heretofore, in that reactor type a nuclear meltdown accident, a so-called MCA (Maximum Credible Accident), is not flatly excluded as a possibility.

Investigations have also been made as to whether or not steam explosions might occur during a core meltdown, and whether or not the water vapor suddenly produced in such a critical phase might not cause the pressure vessel to collapse. There is no question that such accidents, however theoretical they might be, must be made controllable.

In a hypothetical serious accident in a nuclear power plant with a water-cooled reactor, it is accordingly assumed that the reactor core will melt. Subsequently, reactor-meltdown products escape from the bottom of the reactor pressure vessel into the shielding pit of the reactor containment. In order to enable such an accident to be controlled, suitable structural provisions must be made to prevent the meltdown products, possibly escaping at excess pressure from the reactor pressure vessel and collecting in the region of the bottom of the nuclear reactor plant, from causing failure of the containment.

A nuclear reactor plant that is known from German Patent 28 40 086, corresponding to UK Patent Application GB 2 030 347 A, for instance, has a collecting device for a reactor core which is melting down. A vertical drain channel is provided below the shielding pit surrounding the reactor pressure vessel. That drain channel passes through the containment and leads into a meltdown pit disposed below the containment.

There the reactor-meltdown products emerging from the reactor pressure vessel are distributed over an absorber bed formed by a steel tub filled with water-free materials. After the steel tub melts, the meltdown products reach the bottom of the meltdown pit. The bottom and the side walls of the meltdown pit are water-cooled, and thus the meltdown products gradually solidify.

In the nuclear reactor plant known from German Published, Non-Prosecuted Patent Application 29 25 680, corresponding to UK Patent Application GB 2 052 133 A, a collecting tub for receiving the meltdown products is also provided and is located below the level of the reactor foundation. The collecting tub is not located directly below the reactor core but rather is located next to it and is connected to the bottom of the reactor building through a chute that ends horizontally above the collecting tub.

In those known structures for receiving the reactor-meltdown products, under unfavorable conditions it may not be possible to prevent a relatively large quantity of water from invading the collecting chamber before or during the outflow of the meltdown products. The result thereof can be that the meltdown products strike the water at high speed and are fragmented there, causing a very forceful, sudden development of steam. The invention is based on the recognition that the quantity of water struck by the reactor-meltdown products should be as low as possible.

A collecting device for reactor-meltdown products is known from FIG. 1 of the publication entitled: Emerging Nuclear Energy Systems 1989, Icenes 89, Karlsruhe, July 3–6, Proceedings of the Fifth International Conference on Emerging Nuclear Systems, pp. 19–24. In that device, a cooled collecting tub is disposed inside the containment directly beneath the reactor pressure vessel, and in that tub the meltdown products spread out over a large area and can cool down in direct contact with water. The steam produced by the heat of decay of the meltdown products condenses in the upper part of the steel hull of a containment, and from there flows back to the collecting device for reactor-meltdown products. In that known nuclear reactor plant as well, it cannot be precluded that even before the failure of the reactor pressure vessel, sump water may collect in the collecting tub and in the shielding pit, so that at the moment of reactor pressure vessel failure there is the risk that the escaping meltdown products will strike the water surface directly and at high speed. Once again, that can cause severe fragmentation of the meltdown products and very forceful steam production, which threatens the containment.

European Published Patent Application 0 392 604 A1, corresponding to U.S. Pat. No. 5,057,271, discloses a collecting and cooling device in which the water inlet is located beneath the reactor pressure vessel. In the case of a meltdown, the reactor-meltdown products and portions of the reactor pressure vessel and its built-in fixtures would drop directly into the water bath. From the standpoint of effective cooling and the aversion of steam explosions, that is not expedient. What is sought is instead a cooling process in which the outflowing reactor-meltdown products will not meet a relatively large quantity of water.

SUMMARY OF THE INVENTION

It is accordingly an object of the invention to provide a device and a method for collecting and cooling reactor-meltdown products, which overcome the hereinafore-mentioned disadvantages of the heretofore-known devices and methods of this general type and which especially provide a core retention device and method operating on the propagation principle, in which in the event of failure of a reactor pressure vessel the forcefulness of steam production caused by contact between the reactor-meltdown products and any water that is present is considerably reduced or even averted entirely.

With the foregoing and other objects in view there is provided, in accordance with the invention, in a nuclear reactor having a reactor pressure vessel, a device for collecting and cooling reactor-meltdown products from the reactor pressure vessel, comprising an antechamber disposed below the reactor pressure vessel; an expansion chamber for the reactor-meltdown products; a channel being disposed between the antechamber and the expansion chamber and having a partition being destructible by the reactor-meltdown products; a coolant reservoir; and a closure element connecting the coolant reservoir to the expansion chamber and being destructible by the reactor-meltdown products.

In accordance with another feature of the invention, the antechamber is lined on the bottom and/or on the walls with fireproof material. Preferably, this material or some other material introduced into the antechamber acts to lower the melting point and thus renders the reactor-meltdown products less viscous, when it alloys with the reactor-meltdown products.

In accordance with a further feature of the invention, the destructible partition is dimensioned in such a way, and is selected in terms of its material in such a way, that after a predetermined time interval, for instance of 20 to 30 minutes, it is destroyed under the influence of the reactor-meltdown products, for instance by being melted.

In accordance with an added feature of the invention, the destructible partition is inserted at the channel inlet, or in other words between the antechamber and the channel. Thus, the antechamber communicates with the expansion chamber through this channel, which preferably slopes downward or has an inclined course. The partition is constructed in such an way, as noted, that it is capable if withstanding the reactor-meltdown products contained in the antechamber for a predetermined time interval of 20 to 30 minutes, for example. Subsequently, the reactor-meltdown products flow by themselves, because of the inclination of the channel, into the expansion chamber and spread out there.

In accordance with an additional feature of the invention, a water reservoir is primarily considered as a coolant reservoir.

In accordance with yet another feature of the invention, the closure element is disposed at the mouth of a supply line from the coolant reservoir to the expansion chamber. The reactor-meltdown products, entering the still dry expansion chamber and spreading out in it, reach this closure element and destroy it, so that the coolant flows out of the coolant reservoir into the expansion chamber. In so doing, the coolant covers the surface of the reactor-meltdown products and cools them down.

In accordance with yet a further feature of the invention, the partition and the closure element are destructible under the influence of the reactor-meltdown products. This can occur by bursting or by melting.

In accordance with yet an added feature of the invention, the partition and/or the closure element may include a glass or plastic plate or a plug of glass or plastic.

It is important that the antechamber on one hand have a relatively small volume, so that little water can collect in it, and that the partition on the other hand withstand its thermal destruction long enough. In accordance with yet an additional feature of the invention, in order to attain the first of these objectives, a thin-walled hollow or filler body can be provided in the antechamber.

With the objects of the invention in view, there is also provided a method for collecting and cooling reactor-meltdown products from a reactor pressure vessel, which comprises collecting reactor-meltdown products in an antechamber disposed below a reactor pressure vessel and keeping the reactor-meltdown products in the antechamber for a predetermined time interval; destroying a partition disposed between the antechamber and an expansion chamber, with the reactor-meltdown products; effecting penetration of the reactor-meltdown products from the antechamber into the expansion chamber and spreading the reactor-meltdown products in the expansion chamber; and destroying a closure element with the reactor-meltdown products disposed in the expansion chamber, for connecting a coolant reservoir to the expansion chamber and permitting coolant to flow into the expansion chamber where the coolant cools the reactor-meltdown products.

In accordance with another mode of the invention, there is provided a method which comprises reacting the reactor-meltdown products with a material in the antechamber for lowering a melting point and rendering the reactor-meltdown products less viscous.

In accordance with a concomitant mode of the invention, there is provided a method which comprises effecting a penetration of the reactor-meltdown products from the antechamber, through a precipitous channel and into the expansion chamber.

It is considered to be an advantage that in the device according to the invention, an impermissible pressure in the containment is avoided even in the unlikely case of the occurrence of reactor-meltdown products.

Other features which are considered as characteristic for the invention are set forth in the appended claims.

Although the invention is illustrated and described herein as embodied in a device and a method for collecting and cooling reactor-meltdown products, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
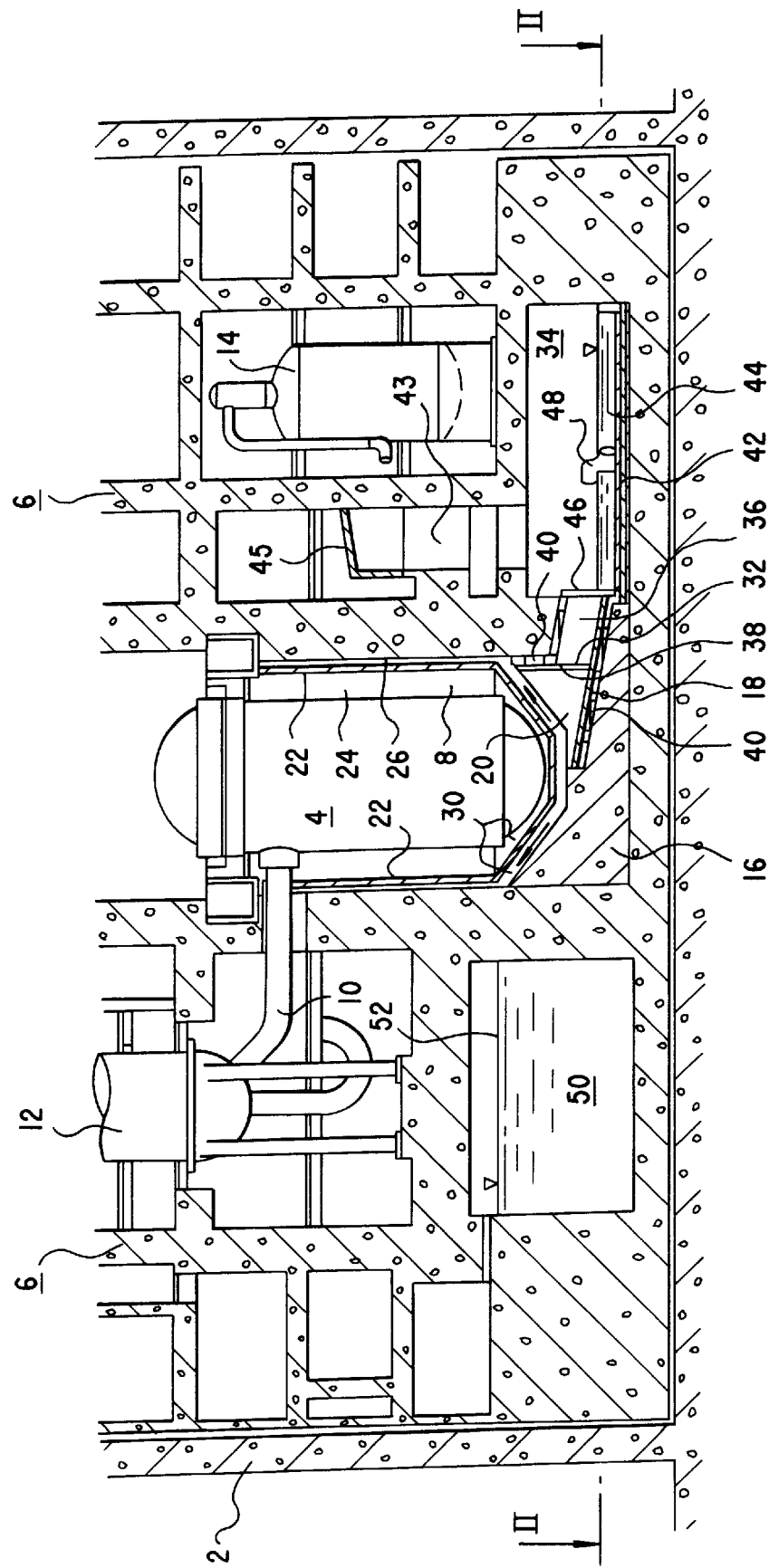
FIG. 1 is a fragmentary, diagrammatic, vertical-sectional view taken along a line I-A-I of FIG. 2, in the direction of the arrows, of a retention and cooling device for reactor-meltdown products that can escape from a reactor pressure vessel.
Figure 2:
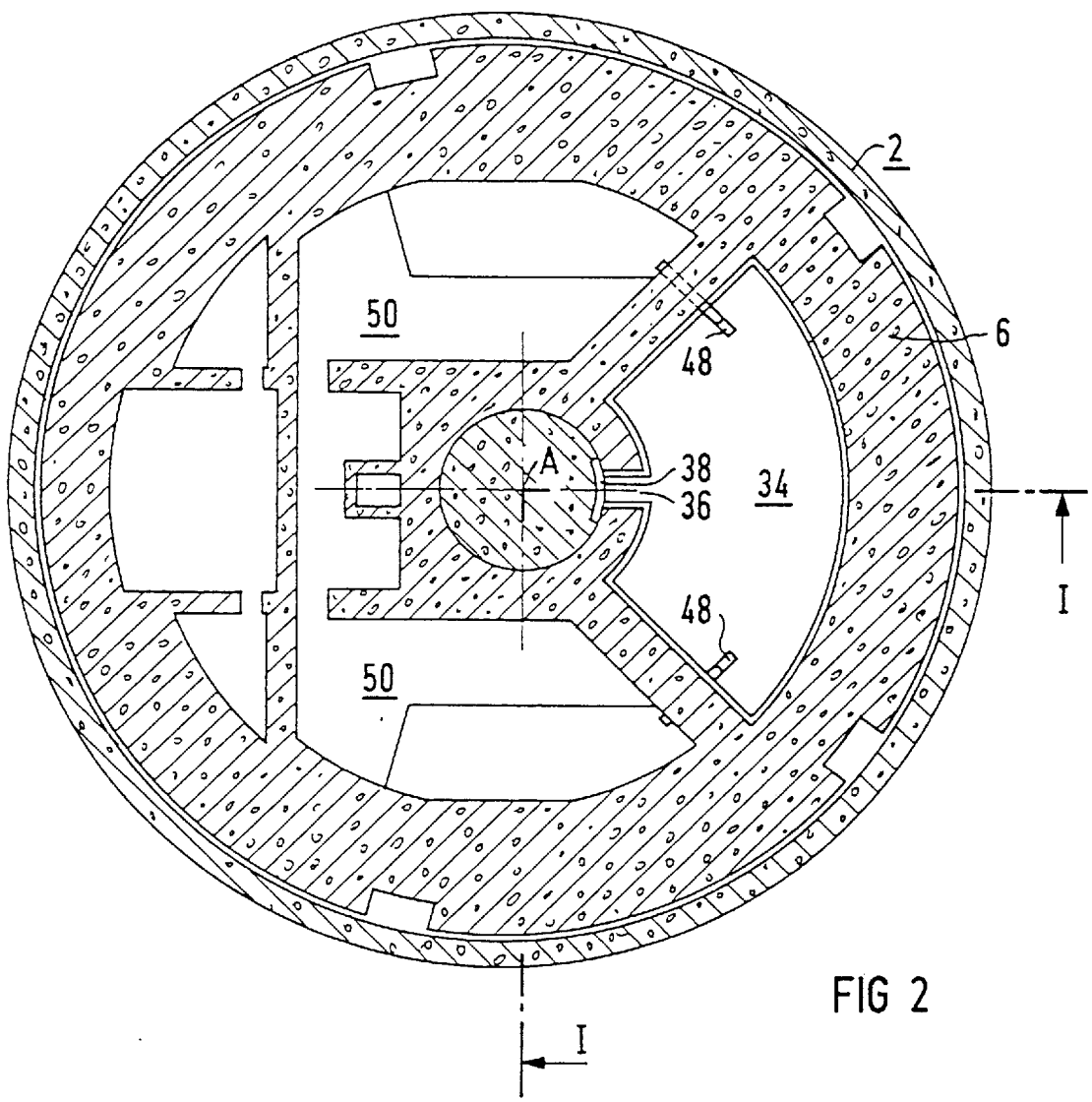
FIG. 2 is a cross-sectional view of the retention and cooling device, which is taken along a line II—II of FIG. 1, in the direction of the arrows.

Referring now to the figures of the drawing in detail and first, particularly, to FIGS. 1 and 2 thereof, there is seen a reactor pressure vessel 4 which is disposed in a reactor containment 2 of a nuclear reactor plant. The reactor pressure vessel 4 is disposed in a shielding pit 8 and is surrounded and supported by a concrete structure 6. The reactor pressure vessel 4 contains a non-illustrated water-cooled reactor or reactor core. The reactor pressure vessel 4 is connected through a primary coolant line 10 to a steam generator 12. A pressure holding and blowoff vessel is indicated by reference numeral 14. It is accommodated in a chamber alongside the reactor pressure vessel 4.

The shielding pit 8 is cylindrical in its upper portion and curved, especially frustoconical, in its lower portion. The frustoconical structure is achieved with the aid of a fire-proof concrete base 16, an applied inclined plane or chute 18, and an inserted water displacement body 20. The body 16 may also be formed of some other material, such as a fire-proof ceramic or special types of stone. The material of the base 16 prevents a reactor melt or reactor-meltdown products from being able to eat through the base downward. The same is true for the material forming the inclined plane 18.

The frustoconical contour of the shielding pit 8 is largely equivalent to that of the reactor pressure vessel 4, which is cylindrically shaped in its upper part and is in the form of a spherical calotte in its lower part. A theoretical accident scenario assumes that this spherical calotte can tear open or break off, so that the reactor-meltdown products located in the reactor pressure vessel 4 pour into the shielding pit 8.

An insulation 22 is accommodated inside the shielding pit 8. The insulation 22 divides the shielding pit 8 into an inner gap chamber 24, which is used for external inspection of the reactor pressure vessel 4 with the aid of manipulators, and an outer gap chamber 26, which is used for ventilation of the reactor pit 8, as is represented by two small arrows. The lower part of the shielding pit 8, in which the spherical calotte of the reactor pressure vessel 4 is located, will be referred to below as an antechamber 30. This antechamber 30 is curved, or frustoconical as shown. In other words, this antechamber 30 is adapted extensively to the geometry of the lower portion of the reactor pressure vessel 4. If the spherical calotte were to break off, it would drop into the antechamber 30. In order to ensure that the escaping reactor-meltdown products should at most strike only a slight volume of water upon the occurrence of such a serious accident, the antechamber 30 has only a small volume below the reactor pressure vessel 4 and it is much smaller than the volume of the reactor pressure vessel 4 itself. This has been accomplished by the shaping and dimensioning thereof.

Figure 4:
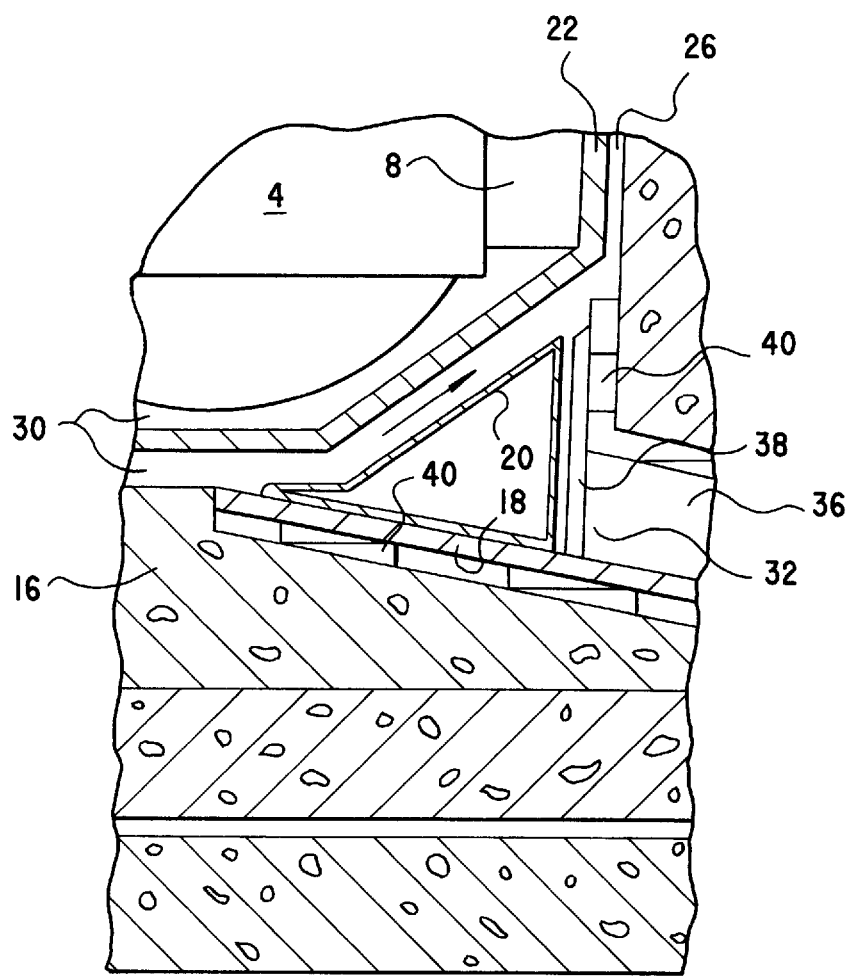
FIG. 4 is an enlarged, fragmentary view of FIG. 1 showing a thin-walled hollow body.

The water displacement body 20 is disposed in the antechamber 30 below the reactor pressure vessel 4, in the right-hand portion of FIG. 1. This displacement body 20 serves to keep an "effective water collection" volume of the antechamber 30 small, so that little water can be available there as a possible consequence of an accident. This displacement body 20 is constructed in particular as a thin-walled hollow body as shown in FIG. 4. It may be composed of thin metal plates. What is important is that if reactor-meltdown products occur in the antechamber 30, it rapidly melts through and makes space available for the collection of the reactor-meltdown products in the antechamber 30. At the same time, it serves to adapt the chamber to an outlet or drain opening 32, which is located on the right and is used for the reactor-meltdown products.

An expansion chamber 34 is placed even further to the right in FIG. 1. What is important is that this expansion chamber 34 be disposed laterally and at some distance from the reactor pressure vessel 4 and that it be kept dry in normal operation. The antechamber 30 is connected to a side wall of the expansion chamber 34 through the drain opening 32 and a channel 36, which is preferably inclined or slopes downward. A bulkhead or partition 38 stands upright at an inlet of the channel 36, in other words upstream of the drain opening 32. This partition 38 is destructible by the reactor-meltdown products. In other words, the partition 38 should be dimensioned in such a way that it is destroyed under the influence of the reactor-meltdown products after a predetermined time interval. By way of example, this time interval may be from 20 to 30 minutes.

The bulkhead or partition 38 may in particular be in the form of a metal plate. In the event of failure, or in other words if the reactor pressure vessel 4 springs a leak, it should be capable of withstanding the residual pressure. This residual pressure may be 20 bar, for instance. It should withstand the pressure and the temperature only until such time as the majority of the reactor core has collected, in the form of reactor-meltdown products, in the lower portion of the shielding pit 8.

The bottom of the antechamber 30 below the displacement body 20 and the bottom of the channel 36, that is the inclined plane 18, are lined with an especially temperature-resistant material 40. However, a material may be provided as a top layer that causes a lowering of the melting point and thereby renders the reactor-meltdown products less viscous or more fluid upon reaction with the reactor-meltdown products. By way of example, there are special types of concrete that disintegrate at 1300° to 1500° C. The temperature-resistant material 40 may also be used as wall material (at least in the region of the drain opening 32), as shown. The bottom of the expansion chamber 34 can also be lined with a special temperature-resistant material 42.

The channel 36 has a height of 1 m and a width of 1.20 m, for instance. In other words, it has a relatively large cross section, to enable a rapid outflow of the reactor-meltdown products. A precipitous course of the channel 36 is preferred, so that a largely residue-free outflow of reactor-meltdown products from the antechamber 30 into the expansion chamber 34 is assured. The reactor-meltdown products follow the course of gravity in this case. The area of the expansion chamber 34 is 150 m$^2$, for example. It can be seen from FIG. 2 that the expansion chamber 34 may be constructed in segments. The level of the reactor-meltdown products after they flow into the expansion chamber 34 is indicated at reference numeral 44 in FIG. 1. An entrance 43 from the containment to the expansion chamber 34 is protected against the entry of water by a hood or covering 45.

A sealing plate 46 is provided at the outlet of the channel 36, that is in the region between the antechamber 30 and the expansion chamber 34. The sealing plate 46 prevents the entry of water from the expansion chamber 34 into the antechamber 30, should that occur despite expectations. The sealing plate 46 may be formed of an insulating material, such as replaceable rubber or a steel plate with external insulation.

An inner flood basin or coolant reservoir 50 is connected to the expansion chamber 34 by way of at least one closure element 48 that is thermally destructible by the reactor-meltdown products as well as through ensuing connections. This reservoir is in particular a water chamber located laterally of the reactor pressure vessel 4. Preferably, a sump that is already present in the reactor plant is used, and the water which is present in the containment collects in it. The water volume may be 1500 m$^3$, by way of example. The water level is indicated by reference numeral 52 in FIG. 1.

One exemplary embodiment of the closure element 48 will be described later below, in conjunction with FIG. 3. The closure element 48 is constructed as a plug or a disk, by way of example. It can be formed of a material, such as glass or plastic, that melts or bursts under the thermal influence of the reactor-meltdown products, for example upon being directly touched by them. The element 48 is constructed in such a way that in that case it uncovers not only the portion of the area being directly wetted but rather a larger area. The closure element 48 can enable a gravity-fed inflow of 100 kg/min, for example. The dimensioning of the connection with the coolant reservoir 50 is selected accordingly. If the water runs into the expansion chamber 34 and therefore onto the reactor-meltdown products, it then takes a relatively long time until the water level has risen on the chute 18 up to about the center line of the reactor pressure vessel 4. This time may, for example, be one hour.

It has already been explained that the expansion chamber 34 is disposed laterally of the antechamber 30 and the reactor pressure vessel 4. Through the use of this important provision it is achieved that in the event of the escape of reactor-meltdown products, the mechanical strains are absorbed essentially by the antechamber 30, while the later thermal strains are essentially absorbed by the expansion chamber 34. In other words, upon the entry of the reactor-meltdown products, the expansion chamber 34 does not have to withstand any direct mechanical strains. However, because of the structure of its bottom, or in other words the choice of the type and dimensions of the material 42, the expansion chamber 34 is capable of long-term resistance to the thermal strains.

In principle, two types of failure of the reactor pressure vessel 4 are conceivable: the entire calotte can tear off, or a hole can occur in the calotte. In both cases, reactor-meltdown products will escape into the antechamber 30, more or less rapidly. However, since little water can accumulate in the gaps 24, 26 in the region of the antechamber because of the slight width and slight volume, the energy effect upon impact of the reactor-meltdown products with this slight quantity of water is tolerable. Another advantage is attained because the reactor-meltdown products in both cases are retained long enough in the antechamber 30 upstream of the hollow body 20 and then solely upstream of the partition 38, that a collecting process will ensue. The reactor-meltdown products are thus retained in the antechamber 30 for a predetermined time interval. After the destruction of the partition 38, the reactor-meltdown products spread through the channel 36 in the expansion chamber 34. They thus cause the destruction of the closure element 48, so that the coolant, which is water or optionally some other coolant, flows out of the reservoir 50 into the expansion chamber 34 and there cools the reactor-meltdown products.

Figure 3:
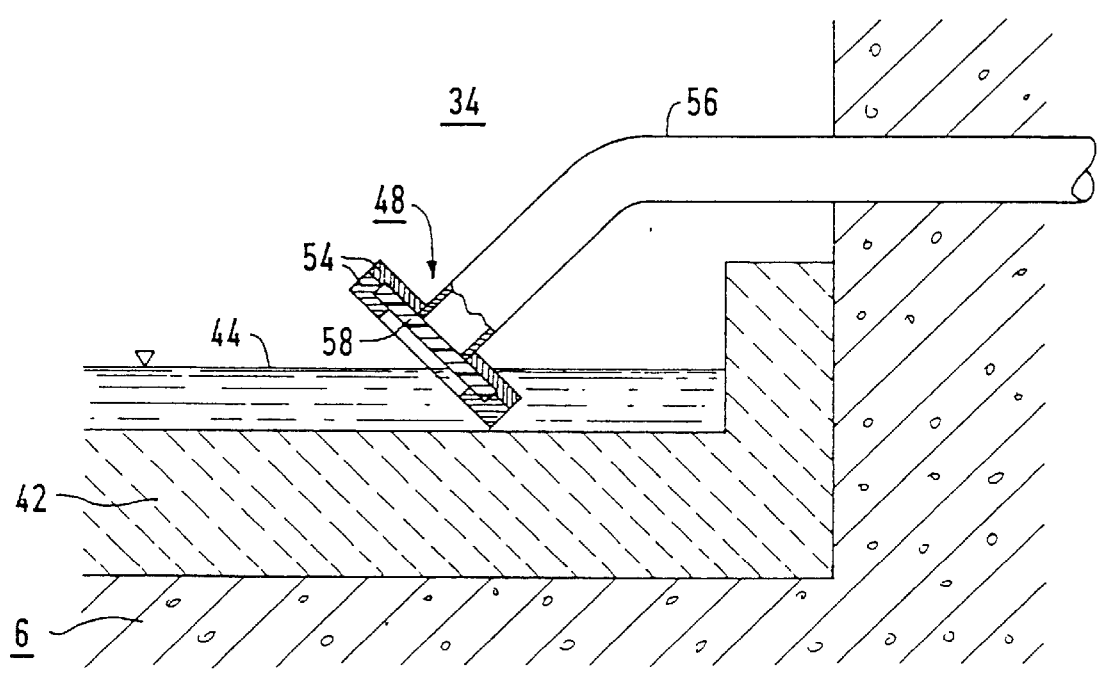
FIG. 3 is an enlarged, fragmentary, vertical-sectional view of an opening device for a water inlet to an expansion chamber.

An exemplary embodiment of the closure element 48 in the expansion chamber 34 is shown in FIG. 3. The closure element 48 is substantially formed of a disk 58 of glass or plastic, which is secured to an end of a connecting tube or supply line 56 formed of steel, for instance, through the use of a flange connection 54. The closure element 48 is disposed in the vicinity of the bottom of the expansion chamber 34, or in other words just above the insulation or thermal protection layer 42.

We claim:

1. In a nuclear reactor having a reactor pressure vessel, a device for collecting and cooling reactor-meltdown products from the reactor pressure vessel, comprising:
   a) an antechamber disposed below the reactor pressure vessel;
   b) an expansion chamber for the reactor-meltdown products disposed completely lateral of said antechamber;
   c) a channel being disposed between said antechamber and said expansion chamber and having a partition being destructible by the reactor-meltdown products;
   d) a coolant reservoir; and
   e) a closure element connecting said coolant reservoir to said expansion chamber and being destructible by the reactor-meltdown products.

2. The device according to claim 1, wherein said antechamber has a bottom surface, wall surfaces and fireproof material lining at least one of said surfaces.

3. The device according to claim 1, including a material lining said antechamber for lowering a melting point and rendering the reactor-meltdown products less viscous upon reaction with the material lining said antechamber.

4. The device according to claim 1, wherein said destructible partition is destroyed under the influence of the reactor-meltdown products after a predetermined time interval.

5. The device according to claim 4, wherein said predetermined time interval is 20 to 30 minutes.

6. The device according to claim 1, wherein said destructible partition is inserted between said antechamber and said channel.

7. The device according to claim 1, wherein said channel slopes downward between said antechamber and said expansion chamber.

8. The device according to claim 1, wherein said coolant reservoir is a water reservoir.

9. The device according to claim 1, wherein said expansion chamber is kept dry during normal operation.

10. The device according to claim 1, including a supply line leading from said coolant reservoir to said expansion chamber and having a mouth, said closure element being disposed at said mouth of said supply line.

11. The device according to claim 1, wherein at least one of said partition and said closure element can be destroyed by bursting or by melting under the influence of the reactor-meltdown products.

12. The device according to claim 1, wherein at least one of said partition and said closure element include a plate or a plug of glass or plastic.

13. The device according to claim 1, including a water displacement body disposed in said antechamber.

14. The device according to claim 13, wherein said water displacement body is a walled hollow body.

15. The device according to claim 1, wherein said antechamber is largely adapted to a contour of the reactor pressure vessel.

16. The device according to claim 15, including an insulation being located in said antechamber and also being largely adapted to a contour of the reactor pressure vessel.

17. The device according to claim 1, wherein said expansion chamber is disposed laterally of the reactor pressure vessel.

18. The device according to claim 1, including a sealing plate being disposed between said expansion chamber and said antechamber for preventing an entry of water from said expansion chamber into said antechamber.

19. The device according to claim 1, wherein said coolant reservoir is disposed laterally of said reactor pressure vessel.

20. The device according to claim 1, wherein said expansion chamber has an area of at least 150 m$^2$.

21. The device according to claim 1, wherein said coolant reservoir has a volume of at least 1500 m$^3$.

22. The device according to claim 1, wherein said expansion chamber has an area of at least 150 m$^2$ and said coolant reservoir has a volume of at least 1500 m$^3$.

23. The device according to claim 1, wherein said expansion chamber is disposed completely lateral of the reactor pressure vessel.

24. The device according to claim 1, wherein said expansion chamber is completely disposed at a distance laterally of the reactor pressure vessel.

25. The device according to claim 1, wherein said expansion chamber is completely disposed at a distance laterally of said antechamber.

26. The device according to claim 14, wherein said walled hollow body has walls formed of metal sheets.

27. A method for collecting and cooling reactor-meltdown products from a reactor pressure vessel, which comprises:
   a) collecting reactor-meltdown products in an antechamber disposed below a reactor pressure vessel and keeping the reactor-meltdown products in the antechamber for a predetermined time interval;
   b) destroying a partition disposed between the antechamber and an expansion chamber, with the reactor-meltdown products, wherein the expansion chamber is disposed completely lateral of the antechamber;
   c) effecting penetration of the reactor-meltdown products from the antechamber into the expansion chamber and spreading the reactor-meltdown products in the expansion chamber; and
   d) destroying a closure element with the reactor-meltdown products disposed in the expansion chamber, for connecting a coolant reservoir to the expansion chamber and permitting coolant to flow into the expansion chamber where the coolant cools the reactor-meltdown.

28. The method according to claim 27, which comprises reacting the reactor-meltdown products with a material in the antechamber for lowering a melting point and rendering the reactor-meltdown products less viscous.

29. The method according to claim 27, which comprises effecting a penetration of the reactor-meltdown products from the antechamber, through a precipitous channel and into the expansion chamber.

\* \* \* \* \*